Patented May 29, 1951

2,554,816

UNITED STATES PATENT OFFICE 2,554,816

HETEROCYCLIC SULFONAMIDES AND METHODS OF PREPARATION THEREOF

James W. Clapp, Darien, and Richard O. Roblin, Jr., Riverside, Conn., assignors to American Cyanamid Company, New York, N. Y., a corporation of Maine No Drawing. Application April 5, 1950, Serial No. 154,206

14 Claims. (Cl. 260—290)

This invention relates to heterocyclic sulfonamides and methods of preparing the same. More particularly, it relates to 5-membered heterocyclic sulfonamides having at least 3-hetero atoms.

It is generally recognized that numerous functions and actions of the human body are largely controlled by a wide variety of enzymes. One of these numerous enzymes is called carbonic anhydrase because it is involved in the metabolism of carbon dioxide. This enzyme has other functions too, since it can catalyze the conversion of carbon dioxide to carbonic acid. The excretion of acid by the kidneys is thought to be due to this function of carbonic anhydrase.

The excretion of acid by the kidneys is one method by which the body normally conserves salt. The maintenance of a constant ratio of salt to water in the body is of utmost importance for general health. In some cases, however, excess salt and water accumulate in the tissues causing a condition which is called edema. It is frequently encountered in association with congestive heart failure. The excess salt and water cause an uncomfortable swelling of the tissues and place an added strain on the heart. To combat this condition so-called diuretic agents are sometimes used to promote the excretion of the excess salt and water. These agents, for the most part, in the past have been mercury derivatives. Since these compounds contain mercury, they are not without toxicity on continued use and furthermore, must be administered by injection.

Shortly after sulfanilamide came into wide spread use Mann and Keilin, Nature 146, page 164 (1940), found that it, but none of the other sulfa drugs, specifically inhibit the enzyme carbonic anhydrase. Within the past year or two sulfanilamide was experimentally used in several cases of congestive heart failure. While sulfanilamide helped to promote the excretion of excess salt and water, it was not sufficiently active to be safely administered in adequate doses. We have now found that certain new 5-membered heterocyclic sulfonamides having at least 3-hetero atoms and derivatives thereof show greatly increased activity over sulfanilamide in inhibiting carbonic anhydrase. These compounds may be illustrated by the following general formula:

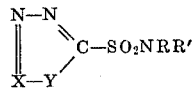

in which R and R' are hydrogen, alkyl, alkaryl, or aryl radicals, X is carbon or nitrogen which may have substituents such as hydroxyl, amino, acylamino or sulfonamide radicals, Y is sulfur or nitrogen which in the case of nitrogen may have substituents such as an aryl or alkyl radical. Also, X, Y may be part of a fused ring system in which the 5-membered ring above forms a ring fused with a 6-membered heterocyclic ring such as pyridine.

These compounds are in general white crystalline solids having definite melting points and being somewhat soluble in water.

The compounds of the present invention are prepared by dissolving the mercapto derivative corresponding to the above formula in an aqueous acid solution and passing in chlorine gas to produce the corresponding sulfonyl chloride. This product is then treated with an excess of ammonia in the form of liquid ammonia or ammonium hydroxide to produce the unsubstituted sulfonamides or with an alkylamine, alkarylamine or arylamine to produce compounds substituted on the sulfonamide group.

The reaction time is not particularly critical, however, chlorine should be added at such a rate that the temperature does not raise excessively and until an excess is present in the reaction mixture. The temperature during the chlorination is preferably maintained within the range of $-10°$ C. to $25°$ C.

The compounds described above were found to be effective carbonic anhydrase inhibitors and as such may prove valuable in the treatment of infections, in the relief of edema associated with congestive heart failure or in other conditions where inhibition of carbonic anhydrase is useful.

The following examples illustrate the preparation of representative 5-membered heterocyclic sulfonamides from the corresponding mercapto heterocyclic sulfonamides. All parts are by weight unless otherwise indicated.

EXAMPLE 1

*1,2,4-triazole-3-sulfonamide*

4.6 parts of 3-mercapto-1,2,4-triazole are dissolved in 80 parts of 2 N hydrochloric acid. The solution is stirred in a cooling bath while chlorine is introduced through a capillary tube until the color of excess dissolved chlorine is pronounced. About one hour is required. The temperature is held below $10°$ C. and preferably below $5°$ C. The precipitated solid is filtered and washed with ice-cold water.

The crude damp 1,2,4-triazole-3-sulfonyl chloride is added gradually to a large excess (about 70 parts) of liquid ammonia. After about one hour, the excess ammonia is allowed to evaporate and the residue is taken up in a small amount of dilute ammonium hydroxide. The extract is treated with activated charcoal, filtered and the filtrate made slightly acid, with chilling. The precipitated product is filtered and recrystallized from a little water. The pure compound is a white crystalline solid, melting point 224.5°–225.5° C., with bubbling.

EXAMPLE 2

*3-hydroxy-4-phenyl-4,1,2-triazole-5-sulfonamide*

3 - hydroxy-5-mercapto - 4 - phenyl-4,1,2-triazole is converted to the corresponding sulfonyl chloride by the method of Example 1. Two parts of the mercapto compound are suspended in 100 parts of 1 N hydrochloric acid and chlorine is passed in for thirty-five minutes. The crude damp sulfonyl chloride is converted to the sulfonamide with liquid ammonia by the method described above. The product is extracted from impurities with ethyl acetate at room temperature. The extract is evaporated and the residue recrystallized from water. The product is obtained as white crystalline solid, melting point 264.5°–266.5° C. (uncorrected), with bubbling. Yield, 32% of theory based on mercapto compound.

EXAMPLE 3

*4-phenyl-4,1,2-triazole-3,5-disulfonamide*

3,5-dimercapto-4-phenyl-4,1,2-triazole is converted to the disulfonyl chloride by the method of Example 1, except that 20% acetic acid (100 parts to 1.9 parts of dimercapto compound) is used as a reaction medium. Chlorine treatment is continued for fifty minutes. The crude damp disulfonyl chloride is converted to the disulfonamide with liquid ammonia by the method of Example 1. It is purified by recrystallization from water. The pure compound is a white, crystalline solid, melting point 242.5°–243.5° C., with decomposition. The yield of disulfonamide was 42% of theory based on dimercapto compound.

EXAMPLE 4

*2-acetylamino-1,3,4-thiadiazole-5-sulfonamide*

2-acetylamino-5-mercapto-1,3,4-thiadiazole is converted to the sulfonyl chloride by the method described above except that 33% acetic acid (66 parts to 4 parts of mercapto compound) is used as a reaction medium. Chlorine treatment is continued for two hours. The crude product can be dried and purified by recrystallization from ethylene chloride. The pure compound is a white crystalline solid, melting point 194° C., with decomposition, when heated rapidly. The crude damp sulfonyl chloride is converted to the sulfonamide by the method of Example 1, with the use of liquid ammonia. The product is purified by recrystallization from water. The pure compound is a white, crystalline solid, melting point 259° C., with decomposition. The yield of sulfonamide was 85% of theory based on mercapto compound.

EXAMPLE 5

*2-amino-1,3,4-thiadiazole-5-sulfonamide*

2-acetylamino-1,3,4 - thiadiazole - 5 - sulfonamide is prepared according to Example 4. Sixty parts of concentrated hydrochloric acid are added to a hot mixture of 40.5 parts of crude acetylamino compound and 400 parts of ethanol. The mixture is boiled under reflux at a moderate rate until solution is complete, and a few minutes longer; about one hour is required. It is then concentrated by distillation at reduced pressure until the residue is syrupy; crystallization usually follows. About 250 parts of water are added, and the mixture is chilled and treated with alkali until it is slightly acid. The crude product is filtered and extracted with dilute hydrochloric acid. The insoluble fraction is filtered, and the filtrate neutralized with alkali. The precipitated product is filtered and recrystallized from water. The pure compound is a white, crystalline solid, melting point 211.5°–212° C., with decomposition. The yield of sulfonamide was 63% of theory based on acetylaminothiadiazole sulfonamide.

EXAMPLE 6

*1,3,4-thiadiazole-2,5-disulfonamide*

2,5-dimercapto-1,3,4-thiadiazole is converted to the disulfonyl chloride by the method of Example 1, except that 33% acetic acid (45 parts to 2.8 parts of dimercapto compound) is used as a reaction medium. Chlorine treatment is continued for ninety minutes. The product can be purified by recrystallization from petroleum ether; when pure, it is a white, crystalline compound, melting point 72°–75° C. The crude damp disulfonyl chloride is converted to the disulfonamide with the use of liquid ammonia. The product is purified by recrystallization from water or ethyl acetate. The pure compound is a white crystalline solid, melting point 184°–185° C., with decomposition.

EXAMPLE 7

*2-acetylamino-1,3,4-thiadiazole-5-sulfon-n-propylamide*

2-acetylamino-5-mercapto-1,3,4-thiadiazole is converted to the sulfonyl chloride as described in Example 4. The product is dried in vacuo, and two parts are added gradually to five parts of dry n-propylamine with stirring in a cooling bath. The mixture is stirred for two hours longer without chilling and the excess amine is allowed to evaporate. The residue is dissolved in dilute sodium hydroxide and the solution filtered from a small insoluble fraction. The product is precipitated with acid, filtered, and recrystallized from ethanol. The pure compound is a white, crystalline solid, melting point 246°–248° C. (uncorrected).

EXAMPLE 8

*2-acetylamino-1,3,4-thiadiazole-5-sulfondi-n-butylamide*

2 - acetylamino - 1, 3, 4 - thiadiazole - 5 - sulfonyl chloride is prepared as described in Example 4. Three parts of the sulfonyl chloride (dried in vacuo) are added to 3.2 parts of di-n-butylamine in four parts of dry pyridine with stirring in a cooling bath. The mixture is stirred for two hours and 25 parts of water are added. The precipitated solid is filtered and recrystallized from ethanol. The pure compound melts at 210.5°–211.5° C.; it is a white, crystalline solid.

EXAMPLE 9

*2-acetylamino-1,3,4-thiadiazole-5-sulfonbenzylamide*

2 - acetylamino - 1,3,4 - thiadiazole - 5 - sulfonyl chloride is prepared as described in Example 4. Three parts of the sulfonyl chloride (dried in vacuo) are added gradually to 2.7 parts of benzylamine in three parts of dry pyridine with stirring in a cooling bath. The mixture is stirred for two hours and treated with 25 parts of water. The solid is filtered and redissolved in dilute ammonium hydroxide. An insoluble fraction is filtered, and the filtrate is acidified. The solid is filtered, redissolved in dilute sodium hydroxide and the solution treated with activated charcoal and filtered. The filtrate is acidified and the product is filtered. It is recrystallized from ethanol. The pure compound is a white crystalline solid, melting point 244°–246° C., uncorrected.

EXAMPLE 10

2-acetylamino-1,3,4-thiadiazole-5-sulfon-p-toluide

2 - acetylamino - 1,3,4 - thiadiazole - 5 - sulfonyl chloride is prepared as described in Example 4. Three parts of the sulfonyl chloride (dried in vacuo) are added gradually to 2.7 parts of p-toluidine in three parts of dry pyridine, with stirring in a cooling bath. The mixture is stirred for one hour and diluted with 25 parts of water. The solid is filtered and extracted with dilute ammonium hydroxide. The insoluble fraction is filtered and the filtrate acidified. The precipitate is filtered and redissolved in dilute sodium hydroxide. The solution is treated with activated charcoal, filtered, and acidified. The product is filtered and recrystallized from ethanol. The pure compound is a white, crystalline solid, melting point 284°–285.5° C., uncorrected.

EXAMPLE 11

1-methyl-5-tetrazolesulfonamide 5-mercapto-1-methyltetrazole is converted to the sulfonyl chloride by the method of Example 1; 1.5 parts of mercapto compound and 21 parts of 0.2 N hydrochloric acid are used, and chlorine treatment is continued for one hour. The crude damp sulfonyl chloride is converted to the sulfonamide with liquid ammonia. The product is extracted from impurities with acetone. The extract is evaporated and the residue recrystallized from ethylene chloride. The pure compound is a white, crystalline solid, melting point 139°–140° C.

EXAMPLE 12

1-phenyl-5-tetrazolesulfonamide 5-mercapto-1-phenyltetrazole is converted to the sulfonyl chloride by the method of Example 1; 1 part of mercapto compound is suspended in 10 parts of 1 N hydrochloric acid, and chlorine treatment is continued for seventy-five minutes. The crude damp sulfonyl chloride is converted to the sulfonamide with liquid ammonia. The crude product precipitates as an oil on acidification of the ammonium hydroxide solution. Extraction of the oil with ether, and evaporation of the extract, gives an oil which crystallizes on rubbing. After recrystallization from ethylene chloride, the compound is obtained as a white crystalline solid, melting point 157°–158° C. Yield of recrystallized product 38% of theory based on mercapto compound.

EXAMPLE 13

Pyrido [2,1-c]-s-triazole-3-sulfonamide 3-mercaptopyrido[2,1-c]-s-triazole is converted to the sulfonyl chloride by the method of Example 1. Six parts of the mercapto compound are suspended in 200 parts of 1 N hydrochloric acid and chlorine is passed in for fifty minutes. The mercapto compound dissolves completely, and the product then gradually crystallizes out. The crude damp sulfonyl chloride is converted to the sulfonamide with liquid ammonia by the method previously described. It is purified by repeated solution in dilute alkali and reprecipitation with acid, and recrystallization from water. The pure compound is a white, crystalline solid, melting point 242°–243° C., with decomposition. The yield of sulfonamide is 36% of theory based on the mercapto compound.

EXAMPLE 14

Pyrido[2,1-c]-s-triazole-3-sulfon-p-toluide

Pyrido[2,1-c]-s-triazole-3-sulfonyl chloride is prepared as described in Example 13. The crude damp product is dissolved in a mixture of ether and chloroform and the solution is dried with anhydrous magnesium sulfate. The solution of the sulfonyl chloride derived from three parts of the mercapto compound is added to a solution of ten parts of p-toluidine in 10 parts of dry pyridine. After standing for three days, the mixture is evaporated to dryness in vacuo. The residue is mixed with water and filtered. The precipitate is extracted with dilute ammonium hydroxide and filtered. The filtrate is neutralized with acid and the precipitated product filtered. It is recrystallized from ethanol. The pure compound is a white, crystalline solid, melting point 244°–245° C.

We claim:

1. Compounds of the group consisting of those having the general formula:

$$X-SO_2NRR'$$

in which R and R' are members of the group consisting of hydrogen, alkyl, alkaryl and aryl radicals and X is a heterocyclic radical of the group consisting of triazole, thiadiazole, tetrazole and pyridotriazole radicals.

2. Compounds of the group consisting of those having the general formula:

$$X-SO_2NH_2$$

in which X is a thiadiazole radical.

3. 2-acetylamino-1,3,4-thiadiazole - 5 - sulfonamide.
4. 1,3,4-thiadiazole-2,5-disulfonamide.
5. 4-phenyl-4,1,2-triazole-3,5-disulfonamide.
6. Pyrido[2,1-c]-s-triazole-3-sulfonamide.
7. 1-phenyl-5-tetrazole sulfonamide.
8. A method of preparing compounds having the general formula:

$$X-SO_2NRR'$$

in which R and R' are members of the group consisting of hydrogen, alkyl, alkaryl and aryl radicals and X is a heterocyclic radical of the group consisting of triazole, thiadiazole, tetrazole and pyridotriazole radicals which comprises reacting the corresponding mercapto derivative with chlorine in the presence of an aqueous acid solution and subsequently with a member of the group consisting of ammonia, an alkylamine, an alkarylamine and an arylamine.

9. A method of preparing compounds having the formula:

$$X-SO_2NH_2$$

in which X is a thiadiazole radical which comprises dissolving a mercapto thiadiazole in an aqueous acid solution, passing chlorine into said solution, mixing the resulting product with liquid ammonia and recovering the thiadiazole sulfonamide therefrom.

10. A method of preparing 2-acetylamino-1,3,4-thiadiazole-5-sulfonamide which comprises dissolving 2-acetylamino-5-mercapto-1,3,4-thiadiazole in aqueous acetic acid solution, passing chlorine into said solution, mixing the resulting product with liquid ammonia and recovering said compound therefrom.

11. A method of preparing 1,3,4-thiadiazole-2,5,-disulfonamide which comprises dissolving 2,5-dimercapto-1,3,4-thiadiazole in aqueous acetic acid solution, passing chlorine into said solution, treating the resulting product with liquid ammonia and recovering said 1,3,4-thiadiazole-2,5-disulfonamide therefrom.

12. A method of preparing 4-phenyl-4,1,2-triazole-3,5-disulfonamide which comprises dissolving 3,5-dimercapto-4-phenyl-4,1,2-triazole in aqueous acetic acid solution, passing chlorine into said solution, mixing the resulting product with liquid ammonia and recovering said disulfonamide therefrom.

13. A method of preparing pyrido [2,1-c]-s-triazole-3-sulfonamide which comprises dissolving 3-mercaptopyrimido[2,1-c]-s-triazole in an aqueous hydrochloric acid solution, passing chlorine into said solution, treating the resulting product with liquid ammonia and recovering said compound therefrom.

14. A method of preparing 1-phenyl-5-tetrazole sulfonamide which comprises dissolving 5-mercapto-1-phenyl tetrazole in an aqueous hydrochloric acid solution, passing chlorine into said solution, treating the resulting product with liquid ammonia and recovering said 1-phenyl-5-tetrazole sulfonamide therefrom.

JAMES W. CLAPP.
RICHARD O. ROBLIN, Jr.

No references cited.